M. BARBAROU.
CASING FOR CARDAN JOINTS.
APPLICATION FILED DEC. 8, 1910.

1,102,853.

Patented July 7, 1914.

UNITED STATES PATENT OFFICE.

MARIUS BARBAROU, OF ST.-DENIS, FRANCE, ASSIGNOR TO SOCIÉTÉ ANONYME DES AUTOMOBILES DELAUNAY-BELLEVILLE, OF ST.-DENIS, FRANCE, A CORPORATION OF FRANCE.

CASING FOR CARDAN JOINTS.

1,102,853.   Specification of Letters Patent.   Patented July 7, 1914.

Application filed December 8, 1910. Serial No. 596,212.

*To all whom it may concern:*

Be it known that I, MARIUS BARBAROU, citizen of the French Republic, residing at St.-Denis, Department of the Seine, in France, have invented certain new and useful Improvements in Casings for Cardan Joints; and I do hereby declare the following to be a full, clear, and exact description of the invention, such as will enable others skilled in the art to which it appertains to make and use the same.

One of the defects presented by the employment of Cardan joints resides in the difficulty experienced in retaining the lubricant in prolonged contact with the parts to be lubricated without experiencing considerable losses. During the rotation the action of centrifugal force constantly tends to expel the fluid particles in which the joints run, thereby largely increasing the consumption of lubricant. The employment of leather sleeves, as heretofore adopted, does not obviate this defect because the lubricant being vigorously forced by centrifugal force against the leather walls and the bindings by means of which they are fixed, works its way through the pores of the leather and through the interstices of the bindings and eventually bursts the leather envelop in which it is contained.

The present invention consists of a device having for its object to obviate this defect while causing the lubricant to remain permanently in contact with the parts to be lubricated and preventing it from being projected to the exterior.

This device is represented in the accompanying drawing, where—

Figure 1:
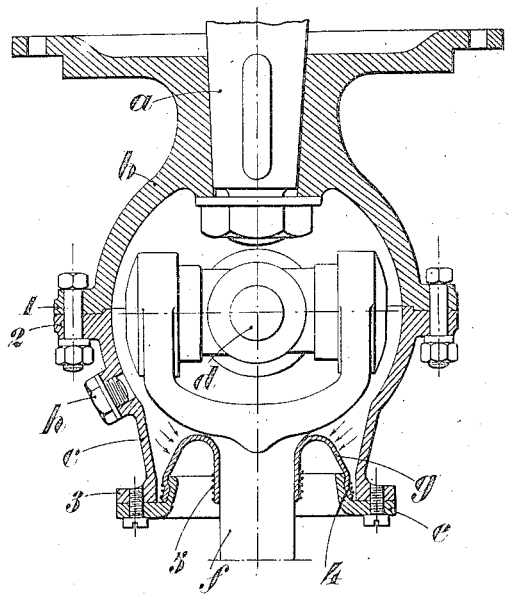
Figure 2:
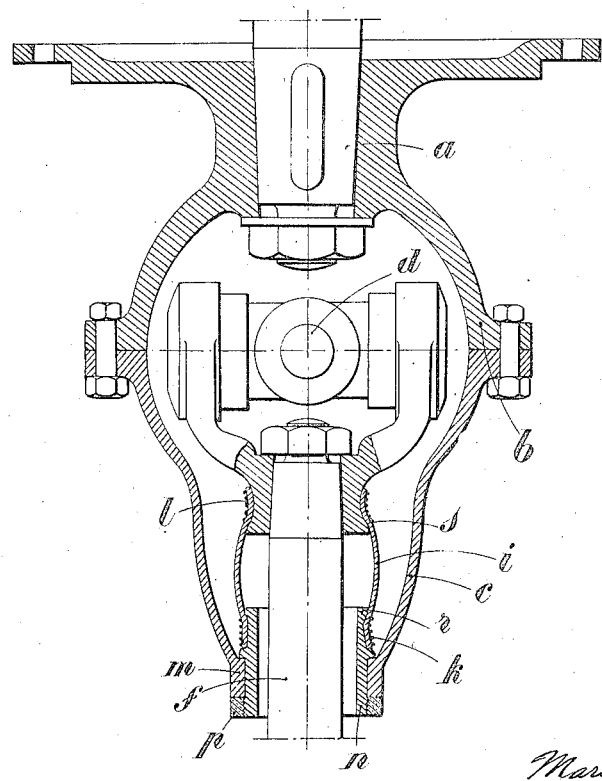

Figure 1 is a horizontal section of a Cardan box, on the axes of the shafts. Fig. 2 shows a modified construction.

The substantially hemispherical front casing member of the Cardan joint is keyed on the driving shaft $a$, and rearwardly this member or section ends in a flange 1 to which a corresponding flange 2 of the rear section $c$ of the Cardan joint is bolted. The sections $b$ and $c$ which form the case of the Cardan joint hold between them the two bearings which receive the shaft $d$ of the ordinary Cardan cross; a joint interposed between $b$ and $c$ which embraces the bearings and the ends of the cross provides a good joint for the assemblage of the parts. Internally the section $c$ is flared, its large base being located in the plane of assemblage of $b$ and $c$; toward the rear it ends in a flange 3 upon which a collar $e$ is fixed by means of screws or bolts; this collar is frusto-conical in the inverse direction, its central portion being turned over toward the interior of the section $c$. The central hole in the collar is sufficiently large to enable the driven shaft $f$ of the Cardan joint to effect all necessary oscillations.

Between the collar $e$ and the shaft $f$ a retaining leather $g$ is interposed; this leather is pliable and of sufficient thickness, and in section it presents approximately the form of a hollowed semi-torus, the convexity of which is directed toward the front section $b$. By reason of its pliability the retaining sleeve $g$ readily adapts itself to the oscillations of the shaft $f$ without the necessity for subjecting it to abnormal deformations. The leather is fixed by means of bindings 4, 5 upon the collar $e$ and upon the shaft $f$ respectively. Upon the rotation of the whole thus constituted (which has been filled with lubricant through the filling plug $h$) the action of centrifugal force far from projecting the lubricant onto the leather tends to cause the lubricant to flow toward the place in the inner cavity of the sections $b$ and $c$, where the diameter is the maximum; this action is assisted by the flared form of the walls which they are given with this object. The mass of lubricant is thus vigorously applied to the actual part where it is required and cannot be expelled from its metal casing. The maximum tangential effort is rationally applied at the place where the force is the maximum. The retaining leather $g$ on the contrary, is not subjected to the influence of centrifugal force; its purpose is confined to preventing leakages at the shaft $f$ and the collar $e$ by clamping and a suitable arrangement of the bindings. It is not subjected to tensile strains even in case an appreciable internal pressure arising from the heating of the lubricant should occur, such an action resulting in contracting the leather which tends to close up its ports, the pressure being exerted in the direction indicated by the arrows.

In Fig. 2 is represented a device differently arranged.

The front casing section $b$ of the cardan, which is hemispherical in form, is continued by a frusto-conical part $c$ bored cylindrically at its end $m$ to a suitable diameter for the reception of a sleeve $n$ which is held by a nut $p$. The internal diameter of this sleeve is sufficient to permit of the necessary oscillations of the Cardan shaft $f$. Between the collars $r$ and $s$ a piece of leather $i$, pliable but strong, is interposed which presents approximately the form of a cylinder bulged at its middle which readily adapts itself to all displacements of the shaft $f$ without the necessity of undergoing abnormal deformations. The leather is fixed by tying it at $k$ and $l$ upon the collars $r$ and $s$. When the Cardan mechanism filled with lubricant rotates, the action of centrifugal force, far from throwing the lubricant onto the leather, tends to keep it away from same. During the periods of rest the bindings oppose any leakage of lubricant and a perfect joint is thus insured in every case.

It will be noted that in both of the forms illustrated one of the casing members is directly keyed or otherwise fixed to one of the shafts, one element of the cross being clamped between this member and the other casing member or section so that the casing, as a whole, takes the place of one of the forks usually employed in connection with one of the shafts, said casing also serving to inclose all of the working parts of the joint. Of course the casing might be applied directly to the driven shaft instead of the driving shaft if such were desired. The form of the substantially hemispherical casing member applied to one shaft is such as to make unnecessary the use of other protecting devices for the joint at that point. In each instance, the free end of the other casing section is connected with the other shaft by means of a leather or other flexible piece extending between the open end of said section, to the shaft which is capable of oscillation in said open end, the flexible piece being bulged toward the lubricant-containing chamber. In each instance, also, the flexible piece of material is secured to the casing by means of an annular member fixed in the end opening of the casing and extending inward into the latter, the connection between said member and the piece of flexible material being disposed within the casing where it is fully protected. Moreover, it is advisable to bind the flexible piece against said annular member at the inner surface of the latter so that the pressure of oil against the inner surface of the flexible piece will not tend to break or damage the connection formed by the binding of wire or the like.

I claim:

1. In a Cardan joint, the combination of a shaft, an open ended casing secured thereto, means to transmit motion from said shaft and casing comprising a second shaft and means for connecting said second shaft for universal movements within the casing, a piece of flexible material secured at one edge to said means to transmit motion, said second shaft extending through the end opening of said casing and having free play therein, and an annular member detachably secured in said end opening and having a projecting portion extending into the casing, said piece of flexible material being bulged inwardly with reference to the casing and secured at its other edge to that side of said member which faces the casing.

2. In a Cardan joint, the combination of a shaft, a cross connected therewith, a second shaft, an open ended casing inclosing the cross and connected with said second shaft, a sleeve fixed within the open end of said casing around the first shaft, a collar around said first shaft in the inner part of the casing, and a substantially cylindrical piece of flexible material connecting said sleeve and said collar and bulged inwardly with respect to the lubricant chamber constituted by the interior of the casing.

In testimony whereof I affix my signature, in presence of two witnesses.

MARIUS BARBAROU.

Witnesses:
DEAN B. MASON,
LOUIS JOSSO.